United States Patent [19]
Anderson

[11] Patent Number: 5,909,586
[45] Date of Patent: Jun. 1, 1999

[54] METHODS AND SYSTEMS FOR INTERFACING WITH AN INTERFACE POWERED I/O DEVICE

[75] Inventor: Daniel Joseph Anderson, Richmond, Va.

[73] Assignee: The Foxboro Company, Foxboro, Mass.

[21] Appl. No.: 08/744,785

[22] Filed: Nov. 6, 1996

[51] Int. Cl.[6] ................................................ G06F 1/32
[52] U.S. Cl. ............................ 395/750.08; 395/750.01; 395/282; 395/281; 395/882
[58] Field of Search .................... 395/750.01, 750.02, 395/750.08, 750.07, 281, 282, 283, 284, 882, 828, 830

[56] References Cited

U.S. PATENT DOCUMENTS

| | | | |
|---|---|---|---|
| 5,162,986 | 11/1992 | Graber et al. | 364/164 |
| 5,204,663 | 4/1993 | Lee | 340/825.34 |
| 5,301,057 | 4/1994 | Eames | 359/163 |
| 5,410,717 | 4/1995 | Floro | 395/284 |
| 5,490,117 | 2/1996 | Oda et al. | 365/226 |
| 5,551,211 | 9/1996 | Kennedy et al. | 53/371.7 |
| 5,566,121 | 10/1996 | Hadderman et al. | 365/222 |
| 5,606,704 | 2/1997 | Pierce et al. | 395/750.04 |
| 5,668,419 | 9/1997 | Oktay | 307/126 |

FOREIGN PATENT DOCUMENTS

| | | | |
|---|---|---|---|
| 0 658 851 A2 | 6/1995 | European Pat. Off. | G06F 13/40 |
| 97/19397 | 5/1997 | European Pat. Off. | G06F 1/16 |
| WO 97/19397 | 5/1997 | WIPO | G06F 1/16 |

OTHER PUBLICATIONS

Un "dongle" a puce de telecarte, 2429 Electronique Radio Plans (1991) Nov., Novenbre, 528, Paris, FR, pp. 75–78.

*Primary Examiner*—Ayaz R. Sheikh
*Assistant Examiner*—Ario Etienne
*Attorney, Agent, or Firm*—David Barron; Jules Jay Morris; Terrence Martin

[57] ABSTRACT

An I/O device powered by its computer interface is interfaced to a computer through a PC Card. A dongle is included with a cable assembly between the PC Card and the I/O device. Power for the I/O device is supplied thereto by an external power supply connected to the dongle. Using a power status input, the PC card can detect whether the external power supply is operational and connected, and accordingly, the PC Card manages operations with the I/O device.

30 Claims, 7 Drawing Sheets

METHODS AND SYSTEMS FOR INTERFACING WITH AN INTERFACE POWERED I/O DEVICE

TECHNICAL FIELD

The present invention relates, in general, to computer interfaces. In particular, the present invention relates to methods and systems for interfacing a computer to a device requiring that its power be supplied by its computer interface.

BACKGROUND OF THE INVENTION

Computers are often connected to a variety of external devices. These devices may themselves be other computers, digital devices or analog devices. In all cases, the computer interface is designed to interact with the attached devices using proper voltage and current levels.

Some devices require that their computer interface provide them with power besides facilitating communications. Such a requirement increases the complexity of the computer interface circuitry and introduces many problems.

One particular problem with interface supplied power involves maximum voltage and current supply capabilities. For example, a computer may be interfaced with a device having voltage and/or current requirements beyond that which the computer can supply. This particular problem becomes more severe when a low power computer system is interfaced to a device requiring a high current or high voltage power supply.

More specifically, for example, PC Cards (which are also known as PCMCIA cards and IC cards) have very limited current handling abilities. PC Cards cannot draw a large supply current or voltage from the host to which they are connected. Thus, if connected to a device with other than minimal power supply requirements, a PC Card cannot directly act as the power supply therefor. Interfacing PC Cards to such devices is thus problematic. Furthermore, even if a technique for supplying power to the interfaced device is somehow implemented, other issues such as power sequencing are raised.

The present invention is directed toward solutions to the above noted problems.

SUMMARY OF THE INVENTION

In a first aspect, the present invention comprises a computer interface couplable to an interface powered I/O device. The computer interface includes a PC Card, a power source and a cable assembly.

More specifically, the PC Card includes input-output circuitry and at least one power status input. The power source is external to the PC Card and powers the I/O device. The cable assembly is adapted to connect the PC Card and the power source to the I/O device. In particular the cable assembly couples the power source to the at least one power status input such that a power status of the power source is detectable by the PC Card.

As an enhancement, the cable assembly may include a dongle, which may be an internal dongle. Also, the dongle may include a power input for connection to the power source. A power status output and a power supply output may be included with the dongle, wherein the power status output is connected to the at least one power status input of the PC Card through the cable assembly and the power supply output is connected to the I/O device through the cable assembly.

As further enhancements, the dongle may include a filter and a surge suppresser, wherein the power input is connected to the filter and to the surge suppresser. Further, the dongle may include a switching element having a control input, wherein the power input is coupled to the control input of the switching element (e.g., a transistor), and the switching element is connected between the power status output of the dongle and a ground. The dongle may also include a voltage regulator, wherein the power input is coupled to the control input of the switching element through the voltage regulator.

As further enhancements, the dongle may include logic circuitry, wherein an output of the voltage regulator is connected to at least one power supply input of the logic circuitry within the dongle. The logic circuitry may include a clock buffer circuit connected between a clock output of the PC Card and a clock input of the I/O device through the cable assembly.

As one specific implementation example according the present invention, the I/O device may be a GE FANUC Field Control I/O system, wherein the cable assembly is adapted to plug into a control module connector on the I/O device.

In another embodiment, the present invention includes a method of interfacing a PC Card to an I/O device. In the subject configuration, the I/O device is powered by a power supply external to the PC Card, and a cable assembly connects the PC Card, the I/O device and the power supply.

The method includes initializing the PC Card. Accordingly, the PC Card checks a condition indicated by at least one power status line received on the cable assembly, wherein the condition indicates the status of the power supply. If the at least one power status line indicates an unpowered condition, the checking step is repeated until the power status line indicates a powered condition. When the powered condition is detected by the PC Card, the PC Card initializes communications with the I/O device.

As an enhancement, the initialization may include asserting a reset signal directed to the I/O device over the cable. The reset signal is deactivated after the at least one power status line indicates the powered condition. Thereafter, the PC Card initializes the I/O device and operational communications between the PC Card and the I/O device may begin.

As further enhancements, during operational communications between the PC Card and the I/O device, the PC Card may monitor the power status line to detect the unpowered condition. If the unpowered condition is detected, then the unpowered condition is indicated to a host computer to which the PC Card is connected. Further, handling the unpowered condition includes asserting the reset signal until a powered condition is again detected. The powered condition is then indicated to the host computer.

In summary, the present invention facilitates the interfacing of a PC Card to an interface powered I/O device by using a dongle and external power supply. Several advantages and features are a product of the techniques disclosed herein. Firstly, a low-power computer interface (i.e., PC Card) is communicably connected to an I/O device requiring that its computer interface supply its power. Interfacing is performed such that the computer interface can determine the power-status of the I/O device. Further, power-losses at various points in the system are handled gracefully with no hardware damage and with proper reset sequences being affected.

BRIEF DESCRIPTION OF THE DRAWINGS

The subject matter regarded as the present invention is particularly pointed out and distinctly claimed in the concluding portion of the specification. The invention, however, both as to organization and method of practice, together with further objects and advantages thereof, may best be understood by reference to the following detailed description taken in conjunction with the accompanying drawings in which:

DETAILED DESCRIPTION OF A PREFERRED EMBODIMENT

Figure 1:
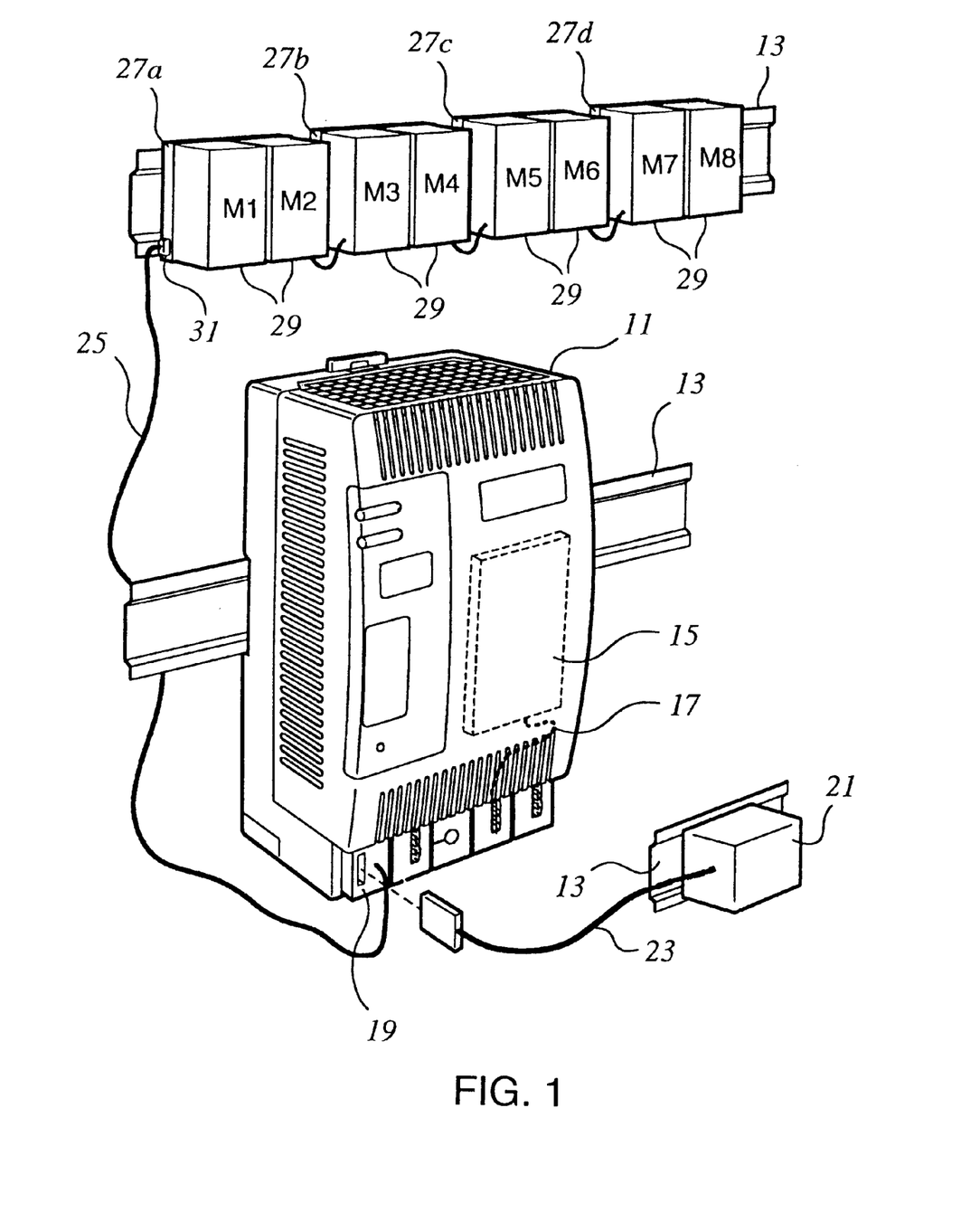
FIG. 1 is a diagram of an I/O system including an I/O device, PC Card, power supply, internal dongle and associated cable assembly according to one embodiment of the present invention.

The techniques of the present invention facilitate the interfacing of a computer input/output ("I/O") card to an I/O device used for, for example, process and environmental control. An example of such a system is shown in FIG. 1. Depicted is a system that includes a host computer ("host") 11, a PC Card computer interface 15, an internal dongle 19, a power supply 21, and an I/O device 27. Cables 17, 23 and 25 interconnect the above-described elements.

More specifically, and according to a preferred embodiment of the present invention, I/O device 27 may comprise daisy chained Field Controller Backplanes from GE FANUC AUTOMATION NORTH AMERICA, INC. of Charlottesville, Va. Up to four backplanes (27a–d) may be linked. This particular I/O device 27 (and others) has multiple positions 29 adapted to receive modules. For example, as shown in FIG. 1, there are a total of two positions per backplane adapted to receive modules. These positions accommodate I/O modules (M1 thru M8). Each I/O module may have a combination of, for example, analog and digital inputs and outputs for connection to a variety of, for example, sensors and actuators. I/O device 27 (i.e., through end backplane 27a) is ordinarily coupled to a control or processor module through at least one connector 31. One example of such a processor module is the model KCGA1: Field Control Genius Bus Interface CPU from GE FANUC AUTOMATION NORTH AMERICA. This processor module supplies power to I/O device 27 (including all four backplanes 27a–d).

According to the techniques of the present invention, a processor module of the type that is ordinarily directly plugged into connector 31 is not used. Instead, a cable assembly that originates at PC card 15 is plugged into connector 31 and provides control of, power for, and connectivity to I/O device 27. The cable assembly includes a dongle 19 that provides signal interfacing and buffering between host 11, power supply 21 and I/O device 27.

PC Card 15 conforms to the PC Card standard entitled "PC Card Standard - February 1995" and published by PCMCIA/JEIDA, which is hereby incorporated herein by reference in its entirety. As discussed earlier, PC Card 15 is plugged into host 11. In the current embodiment, host 11 is a "Micro I/A" controller from The Foxboro Company of Foxboro, Ma., U.S.A. (the "Micro I/A" controller is more specifically described in co-pending U.S. Patent Application entitled "Distributed Control System Including a Compact Easily-Extensible and Serviceable Field Controller", Ser. No. 08/560,167 filed Oct. 10, 1995 which is hereby incorporated herein by reference in its entirety). In the current embodiment, host 11 is a field mountable controller. However, the particular host computer may vary with implementation requirements and in another embodiment could be, for example, a laptop computer.

Figure 2:
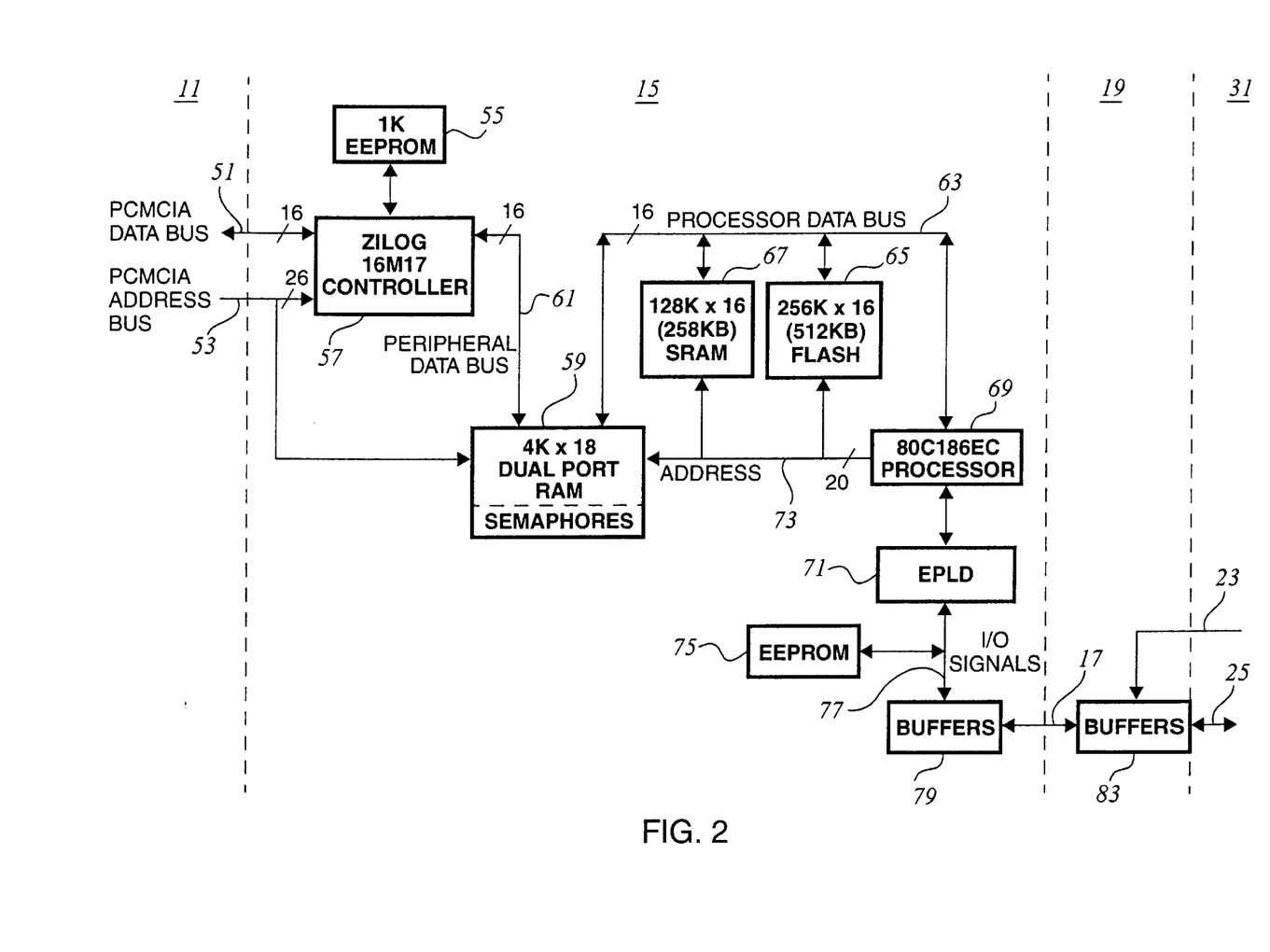
FIG. 2 is a block diagram of the PC Card of FIG. 1 pursuant to an embodiment of the present invention.

In more specific regard to PC Card 15, a block diagram thereof is shown in FIG. 2. Within PC Card 15, communications to host 11 using the PC Card standard is achieved using a PCMCIA interface integrated circuit ("IC") 57 in connection with a PCMCIA data bus 51 and a PCMCIA address bus 53. In one embodiment, a Zilog brand, model 16M17 controller is used, however, other vendors offer ICs providing similar control functionality. A non-volatile configuration memory 55 operates with PCMCIA interface IC 57 to store PCMCIA card configuration information used in connection with the PC Card standard.

According to the present invention, a peripheral data bus 61 connects to both the aforementioned PCMCIA interface IC 57 and a dual-ported memory 59. The PCMCIA address bus 53 also connects to dual-ported memory 59. The size and type of dual-ported memory 59 may vary, but in one embodiment a 4K×16 dual-ported memory is implemented using a pair of 4K×8 dual-ported random access memories ("RAMs"—one RAM for each of the odd and even data busses) from Integrated Device Technologies ("IDT"). During operations, dual-ported memory 59 is preloaded by host 11, and thereafter, a processor 69 on PC Card 15 boots therefrom.

Further information regarding the above-described booting feature may be found in co-pending U.S. Patent Application entitled "PCMCIA Boot from Dual-Ported RAM", serial number (not yet assigned), filed on Sep. 20, 1996 that is hereby incorporated herein by reference in its entirety.

In one embodiment, dual-ported memory 59 may also be used for semaphore based communications between host 11 and processor 69. Accordingly, dual-ported memory 59 includes multiple (for example, sixteen) semaphore registers with associated logic. Addressing of the semaphore registers is provided by selecting a semaphore or memory address space within the dual-ported memory using a control input thereof. Conventional address decode circuitry provides this selection through memory mapping.

To continue, a static RAM 67 ("SRAM") and a FLASH memory 65 are included on PC Card 15. Each of SRAM 67 and FLASH memory 65 connect to processor 69 through a processor data bus 63 and a processor address bus 73.

As examples, SRAM 67 may be implemented using a pair of model HM628128LT7 128K×8 SRAM IC chips from Hitachi. A pair of these chips is necessary when processor 69 comprises an Intel 80C186EC processor because the writing to memory of a single byte is required. A 16 bit wide SRAM would not typically support a single byte width write. FLASH memory 65 may be a model AM29F400T-75EC 256K×16 FLASH memory IC chip from Advanced Micro Devices. Using a 16 bit wide FLASH memory with, for example, an Intel 80C186EC processor is permissible, because in the current implementation, byte only writes are not required in the memory space occupied by FLASH memory 65. EEPROM 75 is used to store high-level I/O configuration data and is accessed as a serial device by processor 69.

To restate, processor 69 is coupled to both processor data bus 63 and processor address bus 73 such that it may operate with FLASH memory 65 and SRAM 67. Furthermore, processor 69 is connected to a programmable logic device ("PLD") 71 that performs many of the control logic functions within PC Card 15. Although not shown, PLD 71 may be connected to almost every device within PC Card 15 to support various functions such as, for example, address decoding according to conventional microprocessor techniques. In one example, PLD 71 may be a Lattice brand, model ispLSI1016-60LT electrically programmable logic device and processor 69 may be an Intel 80C186EC microprocessor.

PLD 71 also function with dongle 19 and processor 69 to communicate with I/O device 29 using proper protocols and signaling. For example, in the current embodiment, the proper protocol and signaling for communicating with a GE FANUC I/O BACKPLANE is implemented. Information on implementing such protocol and signaling is directly available from the GE FANUC in the form of documents entitled "Profibus Bus Interface Unit (BIU) Program Version 1.3 for Field Control Distributed I/O and Control System" and "Lattice Design File (LDF) for Lattice EPLD for Profibus Version 1.3 Bus Interface Unit (BIU)," which are hereby incorporated herein by reference in their entireties. The interfacing of PC Card 15 to I/O device 27 is further facilitated by buffers 79 within PC Card 15 and by buffers 83 within dongle 19 which are described in further detail hereinbelow.

Figure 3A:
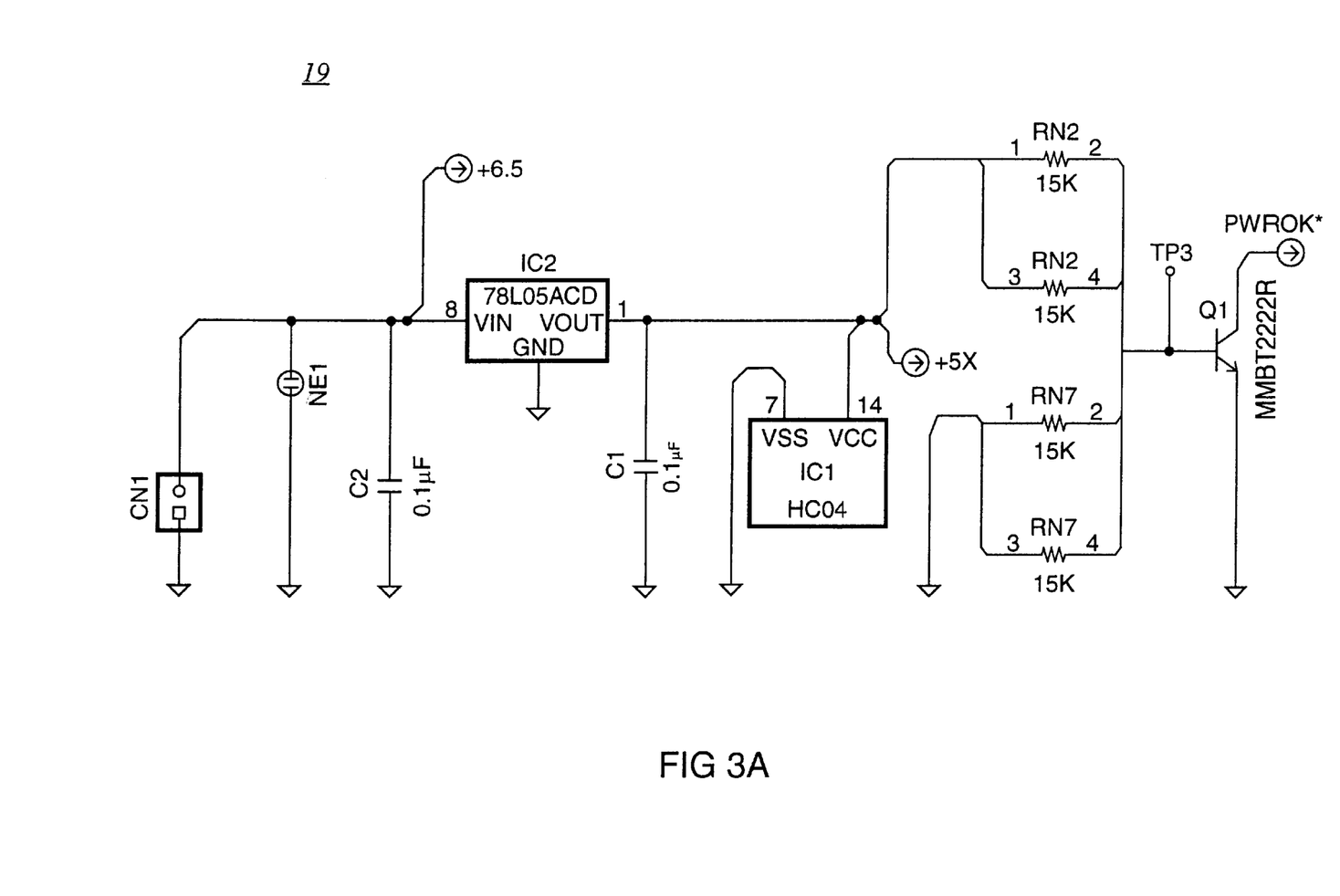
FIGS. 3A–B are schematic diagrams of the dongle of FIG. 1 in accordance with one embodiment of the present invention.
Figure 3B:
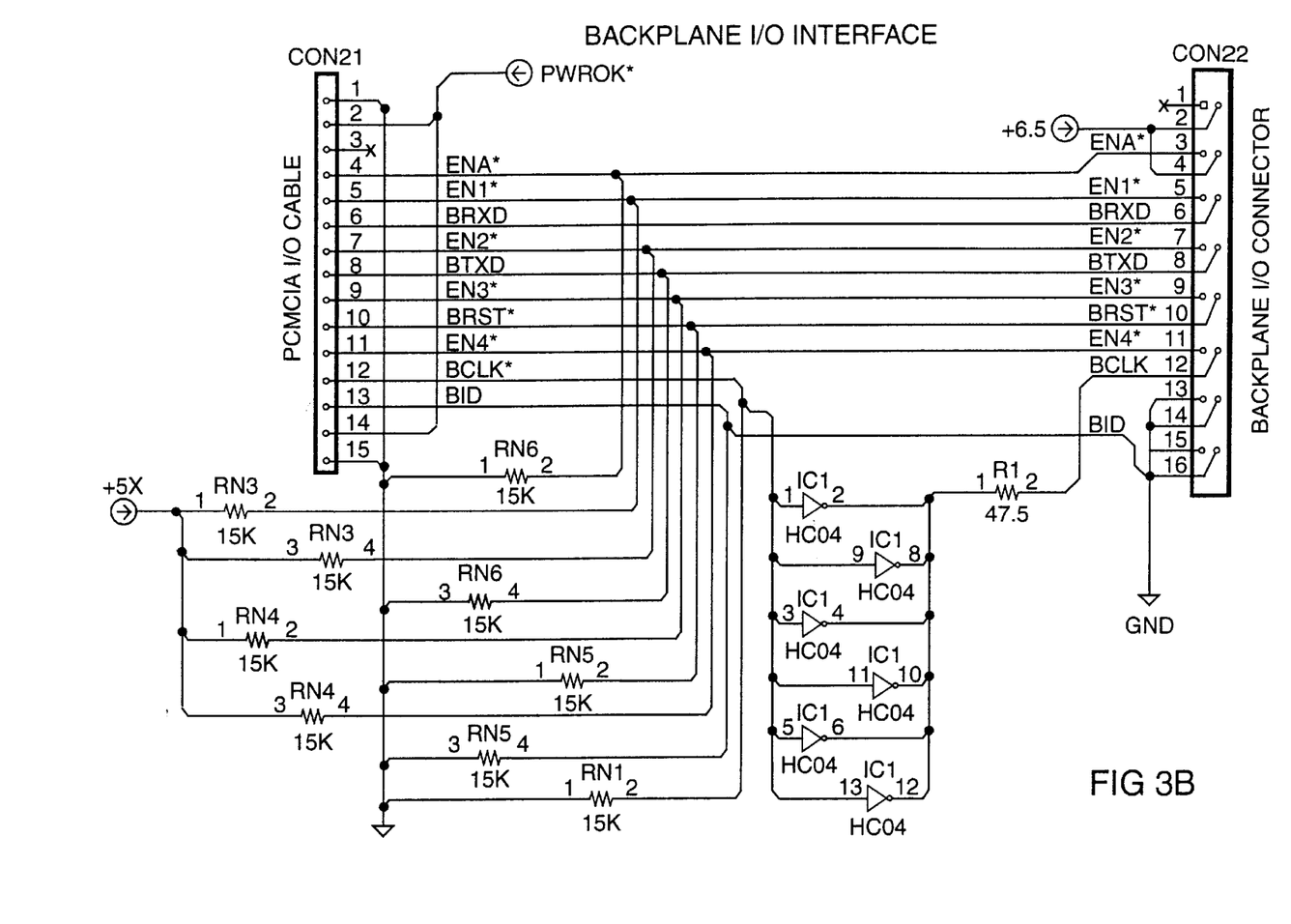

Depicted in FIGS. 3A–3B are schematic diagrams of dongle 19. Dongle 19 is responsible for power distribution and regulation, and for conditioning I/O signals passing between PC Card 15 and I/O device 27. In particular, turning to FIG. 3A, 6.5VDC power from power supply 21 is received at connector CN1. In parallel with connector CN1 is a neon light NE1 configured as a surge suppresser to dissipate voltage spikes into ground. Also parallel connected with connector CN1 is capacitor C2 that provides high frequency noise filtering. This conditioned 6.5VDC power (FIG. 3B)is passed through connector CON22 to I/O device 27 over cable 25, thereby providing power to I/O device 27.

Returning to FIG. 3A, the 6.5VDC power within dongle 19 is also passed through a series connected voltage regulator IC2 that accepts the 6.5VDC input and produces a 5VDC regulated output. The 5VDC regulated output is parallel connected to a capacitor C1 that provides further high frequency filtering. The 5VDC power signal at this point (+5X) is used by a pull-up resistor network for I/O signal conditioning and is also used to power IC1 which provides clock signal buffering (FIG. 3B). The regulated 5VDC signal is also passed through parallel connected resistors within resistor networks RN2 & RN7 (FIG. 3A) to a base of a switching element comprising an NPN transistor Q1 (Note: Networks RN7 & RN2 are used in place of a single resistor to conveniently utilize unused parts already available on board.) An emitter of transistor Q1 is coupled to ground, and a collector of transistor Q1 is passed to PC Card 15 over the PWROK* signal of cable 17.

Operationally, when 6.5VDC power is being properly supplied by power supply 21 though cable 23 to connector CN1, the resulting regulated 5VDC voltage is adjusted for bias by the resistors within RN2 and turns transistor Q1 on, thereby grounding the PWROK* signal. This active low signal (that is normally pulled high by circuitry on PC Card 15) signals PC Card 15 that power is being properly supplied. To note, the PWROK* signal is routed to pins 2 and 14 of connector CON21, which are at opposite physical ends of the connector (FIG. 3B). Thus, connector CON21 must be completely seated for the entire, two line, PWROK* signal to successfully pass to PC Card 15 indicating proper power and connector attachment.

Figure 4:
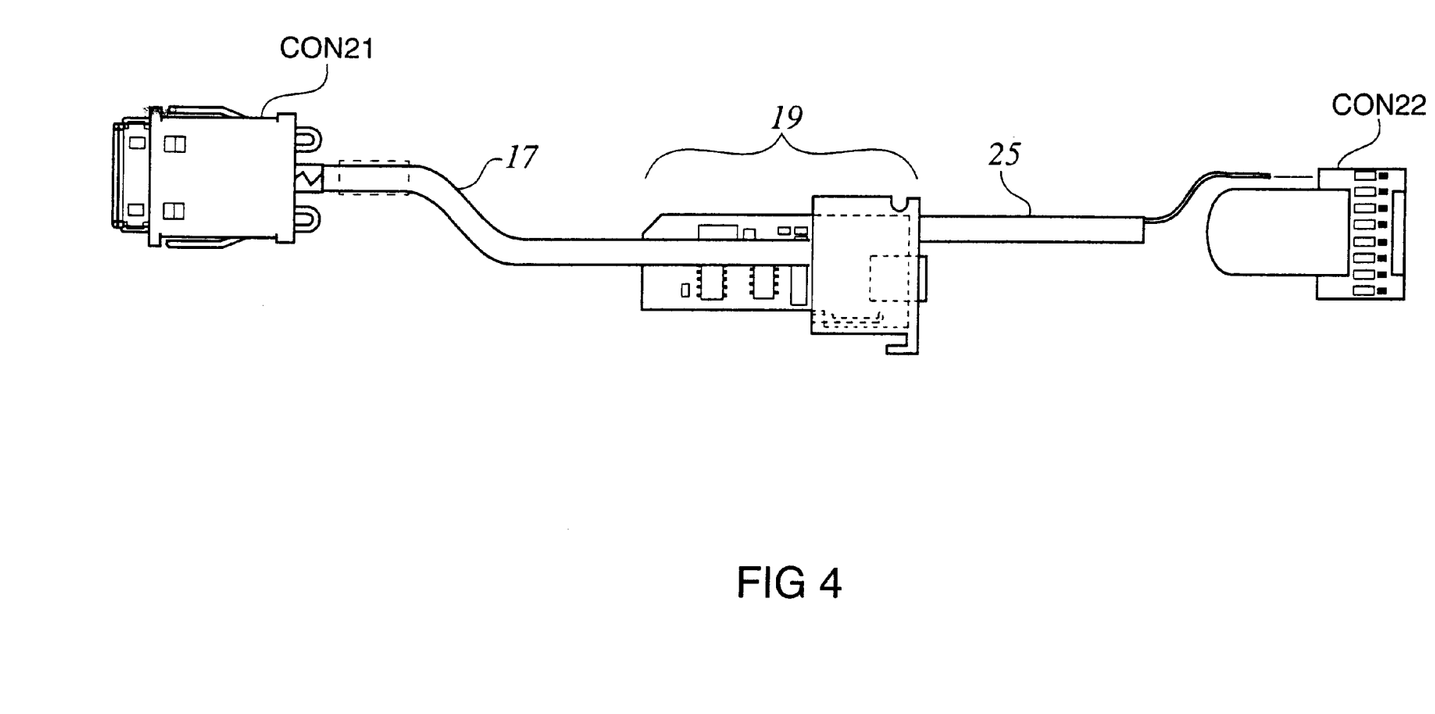
FIG. 4 is an assembly drawing of the internal dongle and associated cable assembly according to an embodiment of the present invention.

Turning to FIG. 4, Signals passing between PC Card 15 and I/O device 27 pass between connectors CON21 and CON22 of cables 17 & 25, respectively. Therebetween, signals are affected by both conditioning and buffering circuitry. The various signals and their processing are described hereinbelow with respect to FIG. 3B:

ENA*—this is an active-low signal that selects the first module in the selected base (e.g., I/O device 27) when low and selects the second module when high. It is pulled low by resistor 1 of resistor network RN6.

EN1*—this is an active-low signal that selects a first base (e.g., I/O device 27a) within a chain of up to four daisy-chained bases. It is pulled high by resistor 1 of resistor network RN3.

BRXD—this is an active-high signal that carries received data from I/O devices 27 to PC Card 15.

EN2*—this is an active-low signal that selects a second base (e.g., I/O device 27b) within a chain of up to four daisy-chained bases. It is pulled high by resistor 2 of resistor network RN3.

BTXD—This is an active-high signal that carries data from PC Card 15 to I/O devices 27. It is pulled low by resistor 2 of resistor network RN6.

EN3*—this is an active-low signal that selects a third base (e.g., I/O device 27c) within a chain of up to four daisy-chained bases. It is pulled high by resistor 1 of resistor network RN4.

BRST*—Backplane reset—this is an active-low signal that resets modules 29 to default (i.e., quiescent/off) conditions. It is pulled low by resistor 1 of resistor network RN5.

EN4*—this is an active-low signal that selects a fourth base (e.g., I/O device 27d) within a chain of up to four daisy-chained bases. It is pulled high by resistor 2 of resistor network RN4.

BCLK*—this is an active-low clock signal that carries inverted clock data to dongle 19. It is passed through six parallel connected inverters within IC1 to provide signal cleanup and inversion that facilitates the driving of the non-inverted clock signal along cable 25 to I/O device 27. The series connected 47.5 ohm resistor R1 between the output of the parallel connected inverters and connector CON22 controls the risetime of the clock signal which reduces ringing and other undesirable effects. This input of the inverters is pulled low by resistor 1 of resistor network RN1.

BID this is an active-high signal that places a module 29 in ID mode so that it responds with module-type information instead of I/O data. This is used to determine the number, type and placement of modules. It is pulled low by resistor 2 of resistor network RN5.

Interrupt processing is utilized to detect whether the power to I/O device 27 and dongle 19 is present via the PWROK* signals. An interrupt 0 is coupled to logically ORed PWROK* signals. However, since in the current embodiment processor 69 has been set to an edge-triggered interrupt mode, the state of interrupt 0 is not directly determinable.

To facilitate detection of the state of the PWROK* signals, they are qualified with a pulse train such that edge triggering is provided. In particular, referring to FIG. 5, logically ORed PWROK* signals (ORed in PLD 71) are connected to the S input of an RS latch 98. An RD* signal and FCIF* signal are logically NORed (in NOR gate 97) and connected to an R input of RS latch 98. FCIF* ("Field Controller Interface") is activated by processor 69 every 250 ms during any accesses (e.g., read and/or write) of PLD 71. RD* is activated by processor 69 during each clip select to PLD 71, and is used to reset RS latch 98 after an interrupt 0 has been generated.

Figure 5:
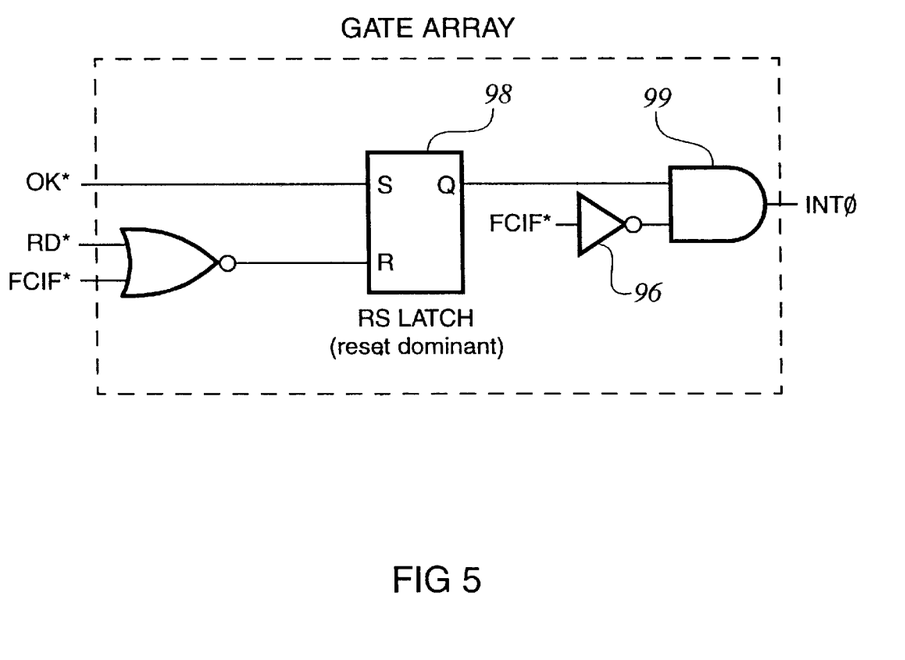
FIG. 5 is a logical schematic of an interrupt handling circuit pursuant to one embodiment of the present invention.

A Q output of RS latch 98 is connected to one input of an AND gate 99 and FCIF (FCIF* inverted by inverter 96) is connected to another input. The output of AND gate 99 is the interrupt 0 signal that is connected to the interrupt 0 input of processor 69.

Operationally, the interrupt will be generated at the processor while FCIF* is low and the RS latch is set (Q=1). Since the falling edge of RD* follows after the falling edge of FCIF*, the interrupt pulse will be present on the processor for this time, and after RD* falls, the latch gets reset and the interrupt signal is removed (Q=0). Thus, an interrupt is generated every 250 ms during a power-loss situation. When power is present, interrupt 0 does not occur every 250 ms, and this lack of periodic interrupts is used to detect a power-present situation.

The above-described logic circuitry is implemented within PLD 71, however, other hardware and/or software could be utilized to affect the same logic functions.

Figure 6:
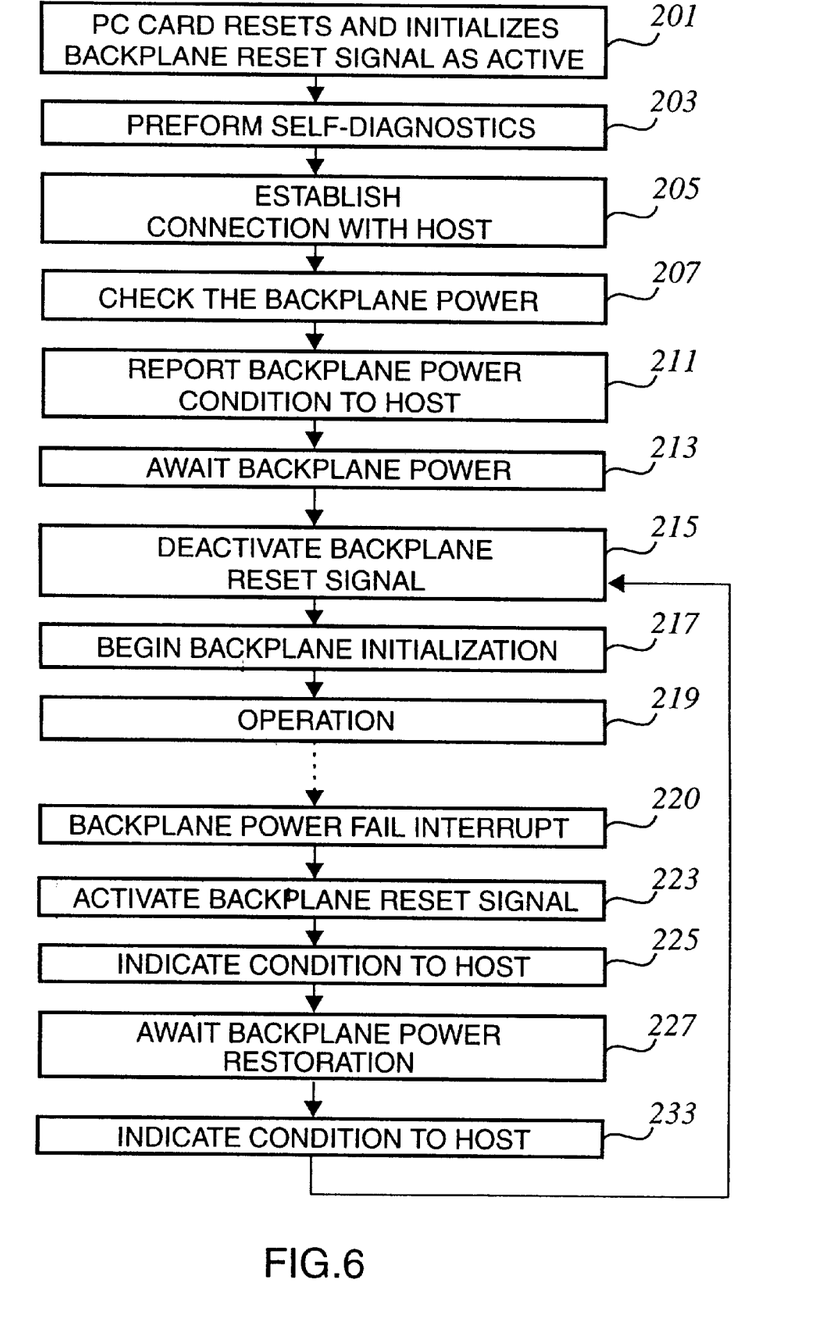
FIG. 6 is a flow diagram of a technique for operating the system of FIG. 1 in conformance with an embodiment of the present invention.

Turning to the flow diagram of FIG. 6, a method of operating PC Card 15, dongle 19 and I/O device 27 according to the present invention is depicted. To begin, PC Card 15 is reset (for example, a hardware reset, software reset or power-up condition) and as an initial step, sets backplane reset signal BRST* active, STEP 201. An active BRST* insures that I/O device 27 will be held in an inactive, known reset condition. PC Card 15 then performs appropriate internal self-diagnostics, STEP 203. After the self-diagnostics are completed, a software connection with host 11 is established through conventional use of device driver software techniques, STEP 205.

To continue, a test is performed by PC Card 15 to determine if external power is being supplied to dongle 19 and I/O device 27. This is done by insuring that a backplane power fail interrupt (interrupt 0) has not occurred, STEP 207. The power status is then reported to host 11, STEP 211. The presence of backplane power is then awaited by, again, checking interrupt 0, STEP 213.

Once power is present, PC Card 15 deactivates backplane reset signal BRST*, STEP 215. This facilitates the operation of I/O device 27. Initialization of I/O device 27 by PC Card 15 then begins, STEP 217. This initialization will vary with the properties of the particular I/O device 27. As an example, initialization may include the setting of initial and operational parameters such as voltages, currents and logic levels for I/O points within I/O device 27. Thereafter, actual operations using I/O device 27 begins, STEP 219. Operation may include, for example, host 11 reading and setting I/O points on I/O device 27 through the use of PC Card 15 as an interface.

If interrupt 0 becomes active during operations, STEP 220, power to dongle 19 and I/O device 27 has failed. As a result of this event, the backplane reset signal BRST* is activated, STEP 223, and the power condition is reported to host 11, STEP 225. Restoration of backplane power is then awaited by insuring that interrupt 0 has not occurred, STEP 227. Upon power restoration, host 11 is notified of the power status, STEP 233, and the above process repeats beginning with the deactivation of backplane reset signal BRST*, STEP 215.

To summarize, the present invention facilitates the interfacing of a PC Card to an interface powered I/O device by using a dongle and external power supply. Several advantages and features are a product of the techniques disclosed herein. Firstly, a low-power computer interface (i.e., PC Card) is communicably connected to an I/O device requiring that its computer interface supply its power. Interfacing is performed such that the computer interface can determine the power-status of the I/O device. Further, power-losses at various points in the system are handled gracefully with no hardware damage and with proper reset sequences being affected.

Described above are examples of techniques for interfacing a PC Card to an I/O device. It will be apparent to those of ordinary skill in the art that the above-described flows and sequences of steps are only examples. There can be many variations to the above, including, for instance, processing more or less than the steps described above, modifying one or more of the steps, or changing the order of some steps without departing from the true spirit and scope of the present invention. These variations are, therefore, considered a part of the claimed invention.

While the invention has been described in detail herein, in accordance with certain preferred embodiments thereof, many modifications and changes thereto may be affected by those skilled in the art. Accordingly, it is intended by the appended claims to cover all such modifications and changes as fall within the true spirit and scope of the invention.

What is claimed is:

1. A computer interface couplable to an interface powered Input/Output ("I/O") device, said computer interface comprising:

a PC Card, said PC Card including input-output circuitry and at least one power status input;

a power source, external to said PC Card, for powering said I/O device; and a cable assembly adapted to connect said PC Card and said power source to said I/O device, wherein said cable assembly couples said power source to said at least one power status input such that a power status of said power source is detectable by said PC Card.

2. The computer interface of claim 1, wherein said cable assembly includes a dongle.

3. The computer interface of claim 2, wherein said dongle includes a power input for connection to said power source.

4. The computer interface of claim 3, wherein said dongle includes a power status output and a power supply output, said power status output being connected to said at least one power status input of said PC Card through said cable assembly and said power supply output being connected to said I/O device through said cable assembly.

5. The computer interface of claim 4, wherein said dongle includes a filter and a surge suppresser, and wherein said power input is connected to said filter and to said surge suppresser.

6. The computer interface of claim 4, wherein said dongle includes a switching element having a control input, and wherein said power input is coupled to said control input of said switching element, said switching element being connected between said power status output of said dongle and a ground.

7. The computer interface of claim 6, wherein said dongle includes a voltage regulator, and wherein said power input is coupled to said control input of said switching element through said voltage regulator.

8. The computer interface of claim 7, wherein said switching element comprises a transistor, said control input comprises a base of said transistor, and an output of said voltage regulator is coupled to said base of said transistor through at least one resistor.

9. The computer interface of claim 7, wherein said dongle includes logic circuitry, and wherein an output of said voltage regulator is connected to at least one power supply input of said logic circuitry within said dongle.

10. The computer interface of claim 4, wherein said power input is directly connected to said power supply output.

11. The computer interface of claim 2, wherein said dongle includes a clock buffer circuit connected between a clock output of said PC Card and a clock input of said I/O device through said cable assembly.

12. The computer interface of claim 1, wherein said I/O device comprises a GE FANUC Field Control I/O system, and wherein said cable assembly is adapted to plug into a control module connector on said I/O device.

13. A method of interfacing a PC Card to an Input/Output ("I/O") device, said I/O device being powered by a power supply external to said PC Card, wherein a cable assembly connects said PC Card, said I/O device and said power supply, and wherein said method comprises:

(a) initializing said PC Card;

(b) said PC Card checking a condition indicated by at least one power status line received on said cable assembly, said condition being indicative of a status of said power supply;

(c) if said at least one power status line indicates an unpowered condition, repeating said checking step (b) until said power status line indicates a powered condition; and (d) when said powered condition is detected by said PC Card, said PC Card initializing communications with said I/O device.

14. The method of claim 13, wherein said initializing (a) includes asserting a reset signal directed to said I/O device over said cable.

15. The method of claim 14, further comprising deactivating said reset signal after said at least one power status line indicates said powered condition.

16. The method of claim 15, wherein after said deactivating said reset signal, said method includes said PC Card initializing said I/O device.

17. The method of claim 16, wherein after said initializing said I/O device, said method includes beginning operational communications between said PC Card and said I/O device.

18. The method of claim 17, wherein said method further includes, during said operational communications, said PC Card monitoring said power status line to detect said unpowered condition.

19. The method of claim 18, wherein if said unpowered condition is detected during said operational communications with said I/O device, said method includes indicating said unpowered condition to a host computer to which said PC Card is connected.

20. The method of claim 18, wherein if said unpowered condition is detected during said operational communications with said I/O device, said method includes asserting said reset signal.

21. The method of claim 18, wherein if said unpowered condition is detected during said operational communications with said I/O device, said method includes said PC Card monitoring said power status line awaiting detection of said powered condition.

22. The method of claim 21, wherein when said powered condition is restored, said method includes deactivating said reset signal.

23. The method of claim 21, wherein when said powered condition is restored, said method includes indicating said powered condition to a host computer to which said PC Card is connected.

24. The method of claim 21, wherein when said powered condition is restored, said method further includes deactivating said reset signal, indicating said powered condition to a host computer to which said PC Card is connected, said PC Card initializing said I/O device, and resuming operational communications between said PC Card and said I/O device.

25. An Input/Output ("I/O") system comprising:

an I/O subsystem comprising a chassis having at least one module receiving location, a first module receiving location of said at least one module receiving location adapted to receive an I/O type module, said I/O subsystem also including a connector adapted to couple with a control module that would power said I/O subsystem;

a PC Card;

a power source, external to said PC Card, for powering said I/O subsystem; and a cable assembly interconnecting said PC card, said power source and said connector of said I/O subsystem.

26. The I/O system of claim 25, wherein said I/O subsystem comprises a GE FANUC Field Control I/O system.

27. The I/O system of claim 25, wherein said cable assembly includes an internal dongle.

28. The I/O system of claim 27, wherein said internal dongle includes a power input for connection to said power source through said cable assembly.

29. The I/O system of claim 28, wherein said internal dongle includes power supply circuitry for interfacing said PC Card, said I/O subsystem and said power source.

30. The I/O system of claim 29, wherein said internal dongle includes buffer circuitry for interfacing said PC Card to said I/O Subsystem.

* * * * *